US012676550B2

(12) United States Patent
Cao et al.

(10) Patent No.: US 12,676,550 B2
(45) Date of Patent: Jul. 7, 2026

(54) REDUCED COMMON MODE VOLTAGE EMISSION CONVERTER

(71) Applicant: VIRGINIA TECH INTELLECTUAL PROPERTIES, INC., Blacksburg, VA (US)

(72) Inventors: Yuliang Cao, Blacksburg, VA (US); Yijie Bai, Christiansburg, VA (US); Vladimir Mitrovic, Arlington, VA (US); Boran Fan, Blacksburg, VA (US); Dong Dong, Blacksburg, VA (US); Rolando Burgos, Blacksburg, VA (US)

(73) Assignee: VIRGINIA TECH INTELLECTUAL PROPERTIES, INC., Blacksburg, VA (US)

( * ) Notice: Subject to any disclaimer, the term of this patent is extended or adjusted under 35 U.S.C. 154(b) by 219 days.

(21) Appl. No.: 17/932,399

(22) Filed: Sep. 15, 2022

(65) Prior Publication Data

US 2024/0097572 A1     Mar. 21, 2024

(51) Int. Cl.
    *H02M 3/158*     (2006.01)
(52) U.S. Cl.
    CPC ................................. *H02M 3/1582* (2013.01)
(58) Field of Classification Search
    CPC ... H02M 3/1582; H02M 1/08; H02M 3/33573
    See application file for complete search history.

(56) References Cited

U.S. PATENT DOCUMENTS 6,166,527 A * 12/2000 Dwelley ............. H02M 3/1582
                                                 323/283
8,531,055 B2 * 9/2013 Adest .................... G01S 3/7861
                                                  307/85

(Continued)

FOREIGN PATENT DOCUMENTS

CN     103746557 A * 4/2014
CN     208001232 U * 10/2018
CN     109768706 A * 5/2019

OTHER PUBLICATIONS

Tanveer Ashmad, Zia Ullah, Mishkat Ullah Jan; Sinusoidal Symmetrical & Asymmetrical PWM Based Three Phase Inverter Design; First International Conference on Emerging Trends in Engineering, Management and Sciences, Dec. 30, 2014, 8 pages.*

(Continued)

*Primary Examiner* — Harry R Behm
(74) *Attorney, Agent, or Firm* — Perilla Knox & Hildebrandt LLP; Jonathan A. Paulis

(57) ABSTRACT

Power systems including converters that exhibit reduced common mode voltage emissions are described. In one example, a power converter system includes an input and an output, a multi-level switch bridge coupled between the input and the output, an input capacitor branch coupled across the input, an output capacitor branch coupled across the output, and a controller configured to generate switching control signals for the multi-level buck-boost switch bridge. The multi-level switch bridge also includes a plurality of inductors in one example. In one case, a quadrangular or quadrangle control mode can be relied upon to switch the (Continued)

10 multi-level switch bridge, to minimize the ripple in the inductors, achieve zero voltage switching, reduce common mode electromagnetic interference emission by the converter, and for other benefits.

15 Claims, 9 Drawing Sheets

(56) References Cited

U.S. PATENT DOCUMENTS

| | | | | |
|---|---|---|---|---|
| 2012/0229110 | A1* | 9/2012 | Huang | H02M 3/1582 323/282 |
| 2016/0172976 | A1* | 6/2016 | Mu | H02M 1/0043 323/271 |
| 2016/0329811 | A1* | 11/2016 | Du | H02M 1/14 |
| 2017/0085189 | A1* | 3/2017 | Madsen | H02M 1/44 |
| 2018/0331625 | A1* | 11/2018 | Somani | G05B 19/05 |
| 2019/0199226 | A1* | 6/2019 | Huang Zhan | H02M 3/33584 |
| 2020/0067412 | A1* | 2/2020 | Dilley | H02M 3/1582 |
| 2021/0126537 | A1* | 4/2021 | Lalithambika | H02M 3/158 |
| 2022/0258633 | A1* | 8/2022 | Mallik | H02J 7/02 |
| 2023/0170784 | A1* | 6/2023 | Chen | H02M 3/07 363/13 |

OTHER PUBLICATIONS

Machine translation of CN109768706 by Clarivate Analytics, Nov. 2025, 18 pages.*

Y. Cao et al., "A Three-Level Buck-Boost Converter With Planar Coupled Inductor and Common-Mode Noise Suppression," in IEEE Transactions on Power Electronics, vol. 38, No. 9, pp. 10483-10500, Sep. 2023, doi: 10.1109/TPEL.2023.3279987.

Y. Cao et al., "Common-Mode Noise Reduction and Capacitor Voltage Auto-Balance Using Bridged Midpoints and Coupled Inductor in a 3-L Buck-Boost Converter," in IEEE Transactions on Power Electronics, vol. 38, No. 10, pp. 12365-12369, Oct. 2023, doi: 10.1109/TPEL.2023.3296335.

V. Mitrovic, B. Fan, Y. Cao, Y. Bai, R. Burgos and D. Boroyevich, "Phase Current Reconstruction, DC Link Voltage and RDS-ON Measurement Using Sensors Integrated on Gate Drivers for SiC MOSFET" 2023 22nd International Symposium on Power Electronics (Ee), Oct. 25, 2023, pp. 1-8.

Y. Cao et al., "A 75 KVA Intelligent Power Stages (IPS) Unit Design for Future Grid-interface Application," 2022 IEEE Energy Conversion Congress and Exposition (ECCE), Detroit, MI, USA, Oct. 9, 2022, pp. 1-8.

Y. Cao, Y. Bai, V. Mitrovic, B. Fan, D. Dong and R. Burgos, "3.5 kW/in3 Planar Coupled Inductor Design and Optimization for a 50 kW 3-level Four-Switch Buck-Boost (3L-FSBB) Converter" 2022 IEEE Energy Conversion Congress and Exposition (ECCE), Detroit, MI, USA, Oct. 9, 2022, pp. 1-8.

* cited by examiner

REDUCED COMMON MODE VOLTAGE EMISSION CONVERTER

GOVERNMENT LICENSE RIGHTS

This invention was made with government support under Contract DE-AC05-00OR22725 awarded by the Department of Energy, under Subcontract Number 4000180542 by Oak Ridge National Laboratory. The government has certain rights in the invention. The government has certain rights in the invention.

BACKGROUND

Many electronic devices and systems rely upon power at a constant, defined, and regulated voltage for proper operation. In that context, power conversion devices and systems are relied upon to convert electric power or energy from one form to another. A power converter is an electrical or electro-mechanical device or system for converting electric power or energy from one form to another. As examples, power converters can convert alternating current (AC) power into direct current (DC) power, convert DC power to AC power, change or vary the characteristics (e.g., the voltage rating, current rating, frequency, etc.) of power, or offer other forms of power conversion. A power converter can be as simple as a transformer, but many power converters have more complicated designs and are tailored for a variety of applications and operating specifications.

Examples of converters include buck (e.g., step-down), boost (e.g., step-up), and buck-boost converters. A buck-boost converter typically provides an output voltage that is the same polarity as the input voltage, but at a higher or a lower potential than the input. A non-inverting buck-boost converter can use a single inductor in both the buck inductor mode and the boost inductor mode, along with one or more diodes, switches, and other active devices to control the movement of charge from the input to the output. A buck-boost converter can have an output voltage that is either greater than or less than its input voltage.

A flyback converter is another example of a converter, and it can operate in AC-to-DC or DC-to-DC converter modes. A buck-boost converter can rely upon a single inductor to transfer charge, and a flyback converter typically relies upon a transformer instead of an inductor. The flyback converter is similar to the buck-boost converter but also offers galvanic isolation between the input and the output. Both non-isolated buck-boost converters and isolated flyback converters can produce a range of output voltages, ranging from much larger than the input voltage, down to almost zero.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

DETAILED DESCRIPTION

As noted above, power conversion devices and systems are relied upon to convert electric power or energy from one form to another. A power converter is an electrical or electro-mechanical device or system for converting electric power or energy from one form to another. As examples, power converters can convert alternating current (AC) power into direct current (DC) power, convert DC power to AC power, change or vary the characteristics (e.g., the voltage rating, current rating, frequency, etc.) of power, or offer other forms of power conversion. A power converter can be as simple as a transformer, but many power converters have more complicated designs and are tailored for a variety of applications and operating specifications.

Examples of converters include buck (e.g., step-down), boost (e.g., step-up), and buck-boost converters. A buck-boost converter typically provides an output voltage that is the same polarity as the input voltage, but at a higher or a lower potential than the input. A non-inverting buck-boost converter can use a single inductor in both the buck inductor mode and the boost inductor mode, along with one or more diodes, switches, and other active devices to control the movement of charge from the input to the output. Thus, the buck-boost converter is an example of a DC-to-DC converter. A buck-boost converter can have an output voltage that is either greater than or less than its input voltage.

In the context of power converters, new topologies of power converters including multi-level switch bridges and associated control techniques are described herein. In one example, a power converter system includes an input and an output, a multi-level switch bridge coupled between the input and the output, an input capacitor branch coupled across the input, an output capacitor branch coupled across the output, and a controller configured to generate switching control signals for the multi-level buck-boost switch bridge. The multi-level switch bridge also includes a plurality of inductors in one example. In one case, a quadrangular or quadrangle control mode can be relied upon to switch the multi-level switch bridge, to minimize the ripple in the inductors, achieve zero voltage switching, reduce common mode electromagnetic interference (EMI) emission by the converter, and for other benefits.

Figure 1:
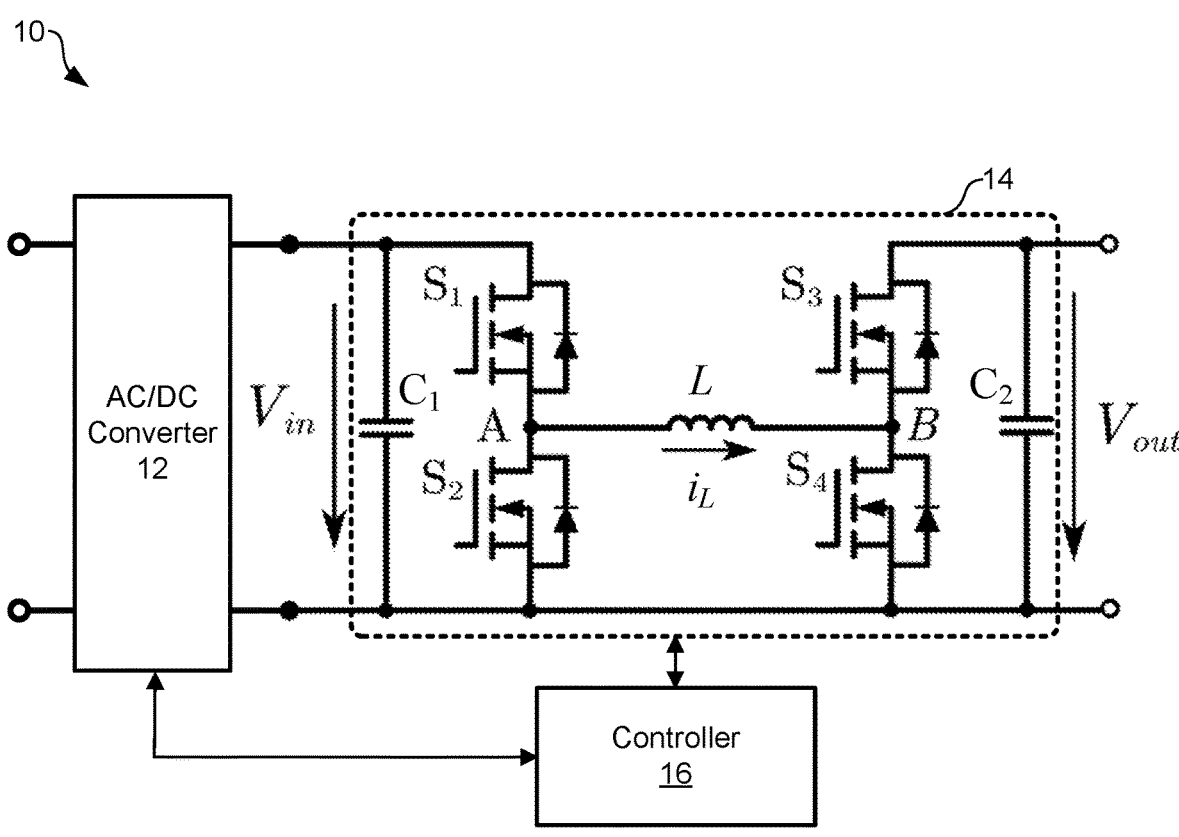
FIG. 1 illustrates an example power converter system according to aspects of the embodiments.

Turning to the drawings, FIG. 1 illustrates an example power converter system 10 ("converter system 10") according to aspects of the embodiments. The converter system 10 includes an input (e.g., left side terminals), an AC-to-DC converter 12, a buck-boost converter 14, a controller 16, and an output (e.g., right side terminals). In the example shown, AC bulk power can be provided at the input of the converter system 10, and a load can be provided at the output of the converter system 10. The converter system 10 is illustrated as a representative example in FIG. 1, to explain certain concepts of power converters and provide context for the embodiments described herein. The converter system 10 is not exhaustively illustrated, and one or more components of the converter system 10 may be omitted from view although included. Alternatively, one or more of the components of the converter system 10 shown in FIG. 1 can be omitted. For example, the AC-to-DC converter 12 can be omitted from the converter system 10 if DC power rather than AC power is provided to the converter system 10.

Input power is provided to the converter system 10. The input power can be bulk AC power in one example, although bulk DC power can be provided to the converter system 10 in some cases. The AC-to-DC converter 12 can be embodied as a front end capable of converting (e.g., inverting or rectifying) 3-phase AC grid voltage, for example, to DC input voltage for the buck-boost converter 14. If bulk DC power, rather than AC power, is provided as an input to the converter 10, the AC-to-DC converter 12 can be omitted.

The AC-to-DC converter 12 can be embodied as one or more active or passive semiconductor devices, such as one or more diodes, switching transistors, or other devices capable of converting AC power to DC power, for input to the buck-boost converter 14. The active or passive devices can be arranged in a bridge configuration, as one example, depending on the type of the bulk AC power provided at the input of the converter system 10, among other design considerations. If the AC-to-DC converter 12 includes active switching transistors, the controller 16 can provide switching signals to turn the switching transistors on and off in an appropriate phasing sequence to rectify or otherwise convert the bulk AC power to DC power.

The buck-boost converter 14 ("converter 14") is configured to convert DC input power at an input voltage Vin to DC output power at an output voltage Vout. In the example shown, the converter 14 includes an input capacitor $C_1$, a switch bridge of transistors $S_1$-$S_4$, an inductor L, and an output capacitor $C_2$, among possibly other components. The converter 14 is capable of bi-directional power conversion, including the capability to convert or transfer power from the input to the output of the converter 14 and from the output to the input of the converter 14. The converter 14 is also capable of step-up and step-down operation, in both directions of power transfer, and can be controlled to minimize the root mean square (RMS) value of $i_L$ in the inductor L and achieve zero voltage switching (ZVS) in some operating modes.

The transistors $S_1$-$S_4$ can be embodied as insulated-gate bipolar transistors (IGBTs) in one example, although any suitable switching transistors (e.g., bipolar, field-effect, etc., transistors) can be relied upon. The transistors $S_1$-$S_4$ can be manufactured from a variety of semiconductor materials, including Silicon materials, III-Nitride materials, and other semiconductor materials. The transistors $S_1$-$S_4$ (also referred to herein as "switches") include an input leg of the switches $S_1$ (also "input-side switch $S_1$") and $S_2$ (also "input-side switch $S_2$") coupled in series across an input of the converter 14 and an output leg of the switches $S_3$ (also "output-side switch $S_3$") and $S_4$ (also "output-side switch $S_4$") coupled in series across an output of the converter 14.

In FIG. 1, the source of the switch $S_1$ is coupled to one the input of the converter 14, the drain of the switch $S_1$ is coupled to the source of the switch $S_2$, and the drain of the switch $S_2$ is coupled to input of the converter 14 in the example shown. Similarly, the source of the switch $S_3$ is coupled to the output of the converter 14, the drain of the switch $S_3$ is coupled to the source of the switch $S_4$, and the drain of the switch $S_4$ is coupled to the output of the converter 14 in the example shown. In some cases, one or more of the transistors $S_1$-$S_4$ can be embodied as modules. For example, the transistors $S_1$ and $S_2$ can be embodied as a first module of the converter 14 coupled across the input of the converter 14, and the transistors $S_3$ and $S_4$ can be embodied as a second module coupled across the output of the converter 14. The converter 14 does not provide galvanic or electrical isolation between the input and the output in the example shown.

The transistors $S_1$-$S_4$ can be driven (e.g., switched on and off) by drive control signals provided to the gates of the transistors $S_1$-$S_4$. The drive control signals are generated by the controller 16, as described herein and understood in the field. The drive control signals are provided to the gates or gate terminals of the transistors $S_1$-$S_4$, to direct the flow of power through the channels of the transistors $S_1$-$S_4$ and, thus, between the input and the output of the converter 14, in either direction. The controller 16 can generate the drive control signals in a buck-boost control mode, a two-mode control mode, a quadrangle control mode, or other control modes for the transfer of power by switching the transistors $S_1$-$S_4$. Example drive control modes of operation are described below with reference to FIGS. 2A-2C. Power flow in the converter 14 can also be directed, at least in part, by phase-shifting the drive control signals of the transistors $S_1$-$S_4$ other using phase shift modulation, for example.

The input capacitor $C_1$ operates as an energy storage element at the input, the inductor L operates as the energy storage and transfer element, and the output capacitor $C_2$ operates as an energy storage element at an output of the converter 14. The capacitor $C_1$ is coupled across the input leg of the switches $S_1$ and $S_2$, and the capacitor $C_2$ is coupled across the output leg of the switches $S_3$ and $S_4$. The capacitors $C_1$ and $C_2$ can be embodied as any suitable type(s) of capacitors at any suitable capacitance(s) based on the application for use of the converter 14, the input Vin and output Vout voltages of the converter 14, the load placed on the converter 14, the operating frequency and duty cycle of the drive control signals provided to the converter 14, the power handling capacity of the converter 14, and other factors.

The inductor L is coupled, at one end, at a node A between the first input-side switch $S_1$ and the second input-side switch $S_2$ of the input leg of the converter 14. The inductor L is also coupled, at another end, at a node B between the first output-side switch $S_3$ and the second output-side switch $S_4$ of the output leg of the converter 14. The inductor L can be embodied as a suitable type of inductor having an inductance based on the application for use of the converter 14, the input Vin and output Vout voltages of the converter 14, the load placed on the converter 14, the operating frequency and duty cycle of the drive signals provided to the converter 14, the power handling capacity of the converter 14, and other requirements or factors. The inductor L can include a ferrite or magnetic core in some cases.

The controller 16 is configured to generate drive control signals for the gates of the transistors $S_1$-$S_4$ in the converter 14, as understood in the field and described herein, to direct the flow of power between the input and the output of the converter 14, in either direction. The controller 16 can be embodied as processing circuitry, including memory, configured to control the operation of the converter 14, with or without feedback. The controller 16 can be embodied as any suitable type of controller, such as a proportional integral derivative (PID) controller, a proportional integral (PI) controller, or a multi-pole multi-zero controller, among others, to control the operations of the converter 14. The controller 16 can be realized using a combination of processing circuitry and referenced as a single controller. It should be appreciated, however, that the controller 16 can be realized using a number of controllers, control circuits, drivers, and related circuitry, operating with or without feedback.

In some cases, the controller 16 can receive a metric or measure of one or more of the input voltage Vin, the input current, the output voltage Vout, the output current, the operating frequency, or other operating metrics of the converter system 10 or the converter 14, as inputs, along with external control inputs. The controller 16 can generate the drive control signals for the gates of the transistors $S_1$-$S_4$ in the converter 14 based, at least in part, on the feedback metrics provided to the controller 16 and a drive control mode or scheme (e.g., a buck-boost control mode, a two-mode control mode, a quadrangle control mode, or other control mode), although the controller 16 can also operate with open loop control in some cases. The duty cycles of the drive control signals can also be varied by the controller 16 to direct the transfer of power by the converter 14.

Figure 2A:
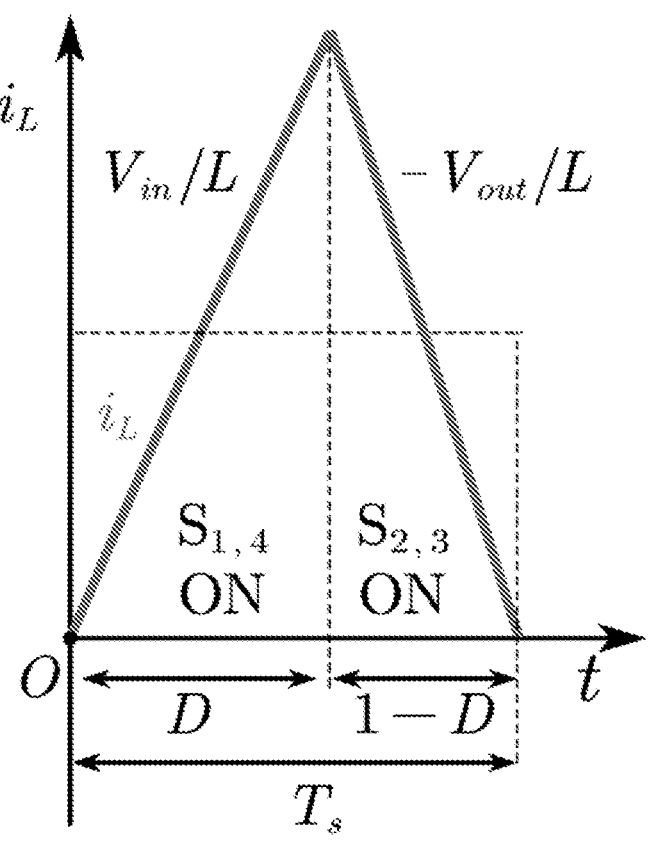
FIG. 2A illustrates an example buck-boost control mode for the converter in the system shown in FIG. 1 according to aspects of the embodiments.
Figure 2B:
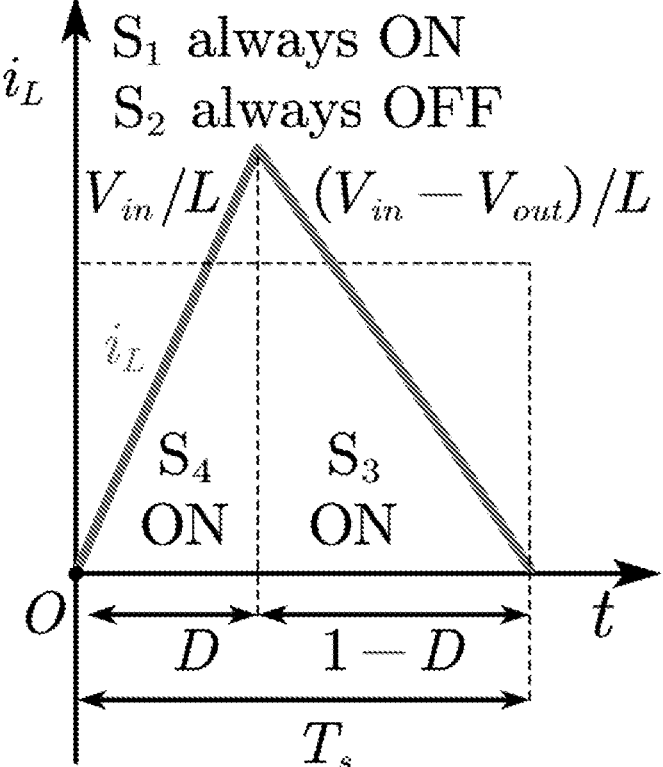
FIG. 2B illustrates an example two-mode control mode for the converter in the system shown in FIG. 1 according to aspects of the embodiments.
Figure 2C:
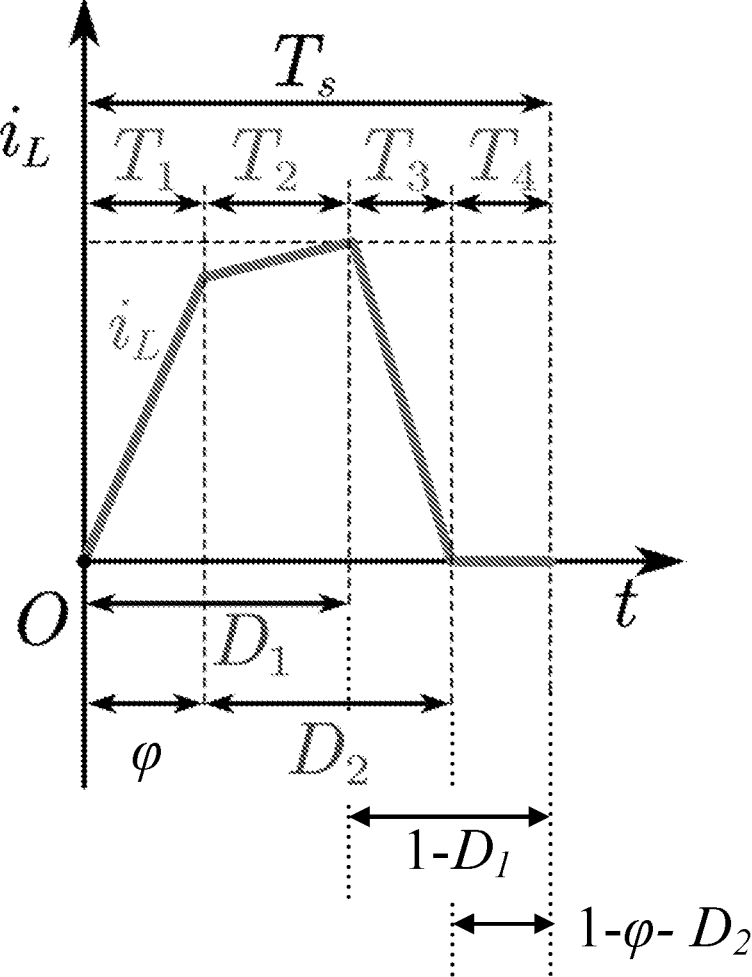
FIG. 2C illustrates an example quadrangular current control mode for the converter in the system shown in FIG. 1 according to aspects of the embodiments.

FIGS. 2A-2C illustrate example switching modes that can be implemented by the controller 16 to generate the drive control signals for the gates of the transistors $S_1$-$S_4$ in the converter 14. The switching modes are provided as representative examples, and the controller 16 can also implement other switching modes and variations on the modes shown in FIGS. 2A-2C. For example, the controller 16 can vary or alter the switching sequences, duty cycles, and other control aspects as compared to that shown in FIGS. 2A-2C, as needed, to change the direction of power transfer, the extent of power transfer, and other operating characteristics of the converter 14. The horizontal axes in FIGS. 2A-2C are associated with time over the switching cycle, and the vertical axes in FIGS. 2A-2C are associated with current $i_L$ in the inductor L. It should be appreciated that the current $i_L$ in the inductor L is illustrated as one example among FIGS. 2A-2C. In practice, the current $i_L$ in the inductor L can vary as compared to that shown, depending on the input and output voltages Vin and Vout (e.g., whether Vin>Vout, Vin=Vout, or Vin<Vout) of the converter 14, the period Ts, the duty cycle D, the inductance of the inductor L, and other factors.

FIG. 2A illustrates an example buck-boost control mode for the converter 14 in the converter system 10 shown in FIG. 1 according to aspects of the embodiments. Particularly, FIG. 2A illustrates an example switching sequence of the drive control signals provided from the controller 16 to the transistors $S_1$-$S_4$ over a switching cycle having a period Ts for buck-boost mode control. The operating frequency of the converter 14 is related to the inverse of the period Ts and can vary among the embodiments as established by the controller 16. $S_1$ and $S_4$ are driven or turned on (i.e., permitting the flow of charge) and $S_2$ and $S_3$ are driven or turned off (i.e., preventing the flow of charge) by drive control signals provided from the controller 16 during the duty cycle D. $S_2$ and $S_3$ are driven or turned on (i.e., permitting the flow of charge) and $S_1$ and $S_4$ are driven or turned off (i.e., preventing the flow of charge) by drive control signals provided from the controller 16 during the remainder of the switching cycle, 1-D. The duty cycle D can vary during the period Ts based on the direction and extent of power transfer provided by the converter 14, among other factors.

FIG. 2B illustrates an example two-mode control mode for the converter 14 in the converter system 10 shown in FIG. 1 according to aspects of the embodiments. Particularly, FIG. 2B illustrates an example switching sequence of the drive control signals provided from the controller 16 to the transistors $S_1$-$S_4$ over a switching cycle having a period Ts for two-mode control. In the forward (e.g., input to output) transfer of power using two-mode control, $S_1$ is driven on over the period Ts (e.g., always on) and $S_2$ is driven off over the period Ts (e.g., always off). $S_4$ is driven or turned on (i.e., permitting the flow of charge) and $S_3$ is driven or turned off (i.e., preventing the flow of charge) by drive control signals provided from the controller 16 during the duty cycle D. $S_3$ is driven or turned on (i.e., permitting the flow of charge) and $S_4$ is driven or turned off (i.e., preventing the flow of charge) by drive control signals provided from the controller 16 during the remainder of the switching cycle, 1-D. The duty cycle D can vary during the period Ts based on the extent of power transfer provided by the converter 14, among other factors. In the backward (e.g., output to input) transfer of power using two-mode control, $S_3$ is driven on over the period Ts (e.g., always on) and $S_4$ is driven off over the period Ts (e.g., always off). Additionally, $S_2$ and $S_1$ are alternately driven or turned on (i.e., permitting the flow of charge) and off (i.e., preventing the flow of charge) by drive control signals provided from the controller 16.

FIG. 2C illustrates an example quadrangular control mode for the converter 14 in the converter system 10 shown in FIG. 1 according to aspects of the embodiments. Particularly, FIG. 2C illustrates an example switching sequence of the drive control signals provided from the controller 16 to the transistors $S_1$-$S_4$ over a switching cycle having a period Ts for quadrangular control. In quadrangular control, the period Ts is divided into four sub-periods, $T_1$, $T_2$, $T_3$, and $T_4$. $S_1$ and $S_4$ are driven on during $T_1$, with $S_2$ and $S_3$ driven off. $S_1$ and $S_3$ are driven on during $T_2$, with $S_2$ and $S_4$ driven off. $S_2$ and $S_3$ are driven on during $T_3$, with $S_1$ and $S_4$ driven off. $S_2$ and $S_4$ are driven on during $T_4$, with $S_1$ and $S_3$ driven off. The duty cycles $D_1$ and $D_2$ can vary during the period Ts based on the extent of power transfer provided by the converter 14, among other factors. A phase shift control variable $\varphi$ is also introduced, as the difference between the start of $D_1$ and $D_2$, and the phase shift $\varphi$ can be tailored to adjust the RMS value of $i_L$ in the inductor L over $D_1$.

Each of the switching or operating modes for the converter 14 shown in FIGS. 2A-2C can offer certain benefits depending on the application for use of the converter 14 and other factors. The quadrangular or quadrangle control mode can preferred in some cases, for example, such as to minimize the RMS value of $i_L$ in the inductor L and achieve ZVS, although other modes can be preferred for other operating characteristics, for simplicity, or other objectives. The efficiency of the converter 14 can be increased using a control mode that incorporates ZVS and wide bandgap transistors $S_1$-$S_4$, although the converter 14 can be tailored for other objectives.

Figure 3:
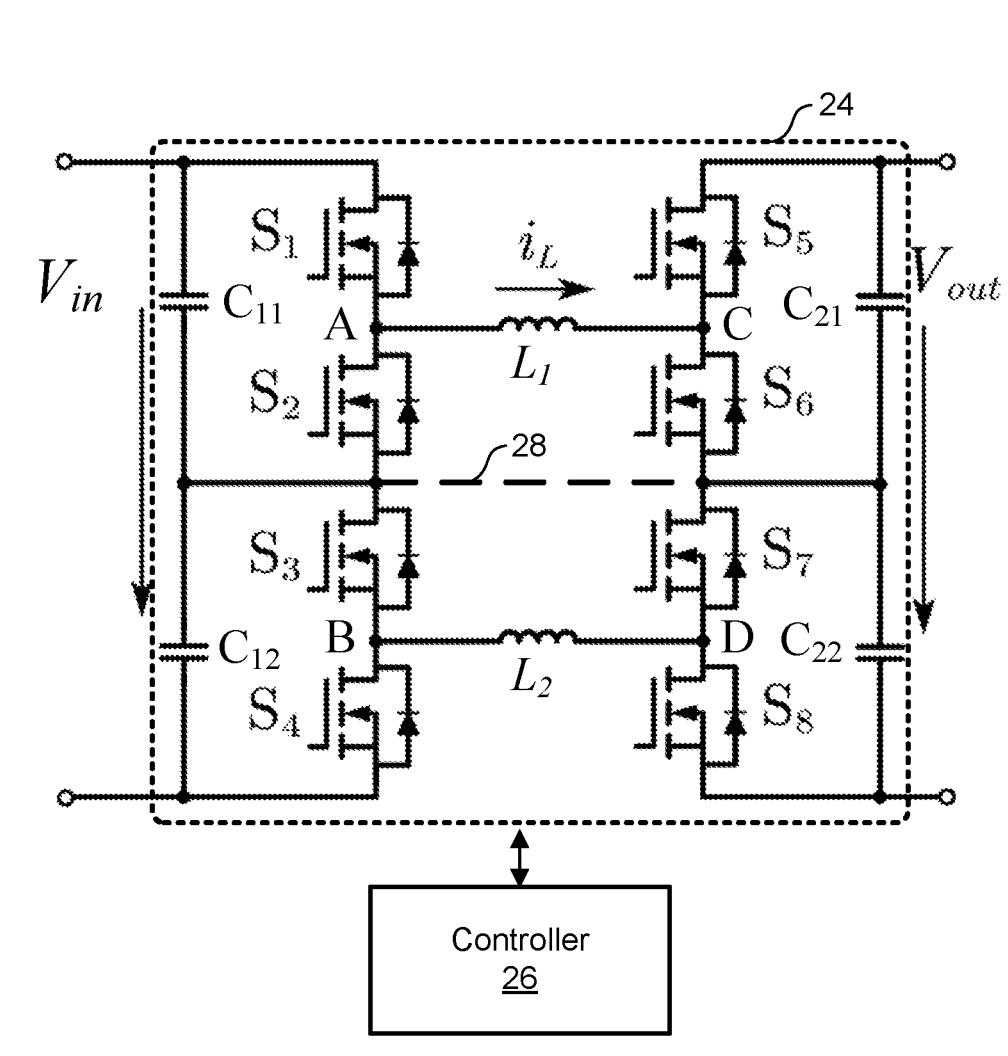
FIG. 3 illustrates an example reduced common mode voltage emission converter system according to aspects of the embodiments.

FIG. 3 illustrates an example reduced common mode voltage emission converter system 20 according to aspects of the embodiments. The converter system 20 includes an input (e.g., left side terminals), a multi-level buck-boost converter 24, a controller 26, and an output (e.g., right side terminals). In the example shown, DC bulk power can be provided at the input of the converter system 20, and a load can be provided at the output of the converter system 20. The converter system 20 is illustrated as a representative example in FIG. 3. The converter system 20 is not exhaustively illustrated, and one or more components of the converter system 20 may be omitted from view although included. Alternatively, one or more of the components of the converter system 20 can be omitted.

Input power is provided to the converter system 20. The input power can be bulk DC power in one example, although bulk AC power can be provided to the converter system 20 in some cases with the use of an AC-to-DC converter as a front end (not shown, see FIG. 1 for example). The multi-level buck-boost converter 24 ("converter 24") is configured to convert DC input power at an input voltage Vin to DC output power at an output voltage Vout. In the example shown, the converter 24 includes an input capacitor branch of capacitors $C_{11}$ and $C_{12}$, a multi-level switch bridge of transistors $S_1$-$S_8$, inductors $L_1$ and $L_2$, and an output capacitor branch of capacitors $C_{21}$ and $C_{22}$, among possibly other components. The converter 24 is capable of bi-directional power conversion, including the capability to convert or transfer power from the input to the output of the converter 24 and from the output to the input of the converter 24. The converter 24 is also capable of step-up and step-down operation, in both directions of power transfer, and can be controlled to minimize the RMS value of $i_L$ in the inductor $L_1$ and achieve ZVS in some operating modes.

The transistors $S_1$-$S_8$ can be embodied as IGBTs in one example, although other types of transistors can be relied upon. The transistors $S_1$-$S_8$ (also referred to herein as "switches") include an input leg of the switches $S_1$-$S_4$ (also "input-side switches $S_1$-$S_4$") coupled in series across an input of the converter 24 and an output leg of the switches $S_5$-$S_8$ (also "output-side switches $S_5$-$S_8$") coupled in series across an output of the converter 24. Particularly, the source of the switch $S_1$ is coupled to one the input of the converter 24, the drain of the switch $S_1$ is coupled to the source of the switch $S_2$, the drain of the switch $S_2$ is coupled to the source of the switch $S_3$, the drain of the switch $S_3$ is coupled to the source of the switch $S_4$, and the drain of the switch $S_4$ is coupled to the input of the converter 24. Similarly, the source of the switch $S_5$ is coupled to one the output of the converter 24, the drain of the switch $S_5$ is coupled to the source of the switch $S_6$, the drain of the switch $S_6$ is coupled to the source of the switch $S_7$, the drain of the switch $S_7$ is coupled to the source of the switch $S_8$, and the drain of the switch $S_8$ is coupled to the output of the converter 24 in the example shown.

In some cases, one or more of the transistors $S_1$-$S_8$ can be embodied as modules. For example, the transistors $S_1$ and $S_2$ can be embodied as a first module of the converter 24, the transistors $S_3$ and $S_4$ can be embodied as a second module of the converter 24, the transistors $S_5$ and $S_6$ can be embodied as a third module of the converter 24, the transistors $S_7$ and $S_8$ can be embodied as a fourth module of the converter 24. The converter 24 does not provide galvanic or electrical isolation between the input and the output in the example shown.

The transistors $S_1$-$S_8$ can be driven (e.g., switched on and off) by drive control signals provided to the gates of the transistors $S_1$-$S_8$. The drive control signals are generated by the controller 26, as described herein and understood in the field. The drive control signals are provided to the gates or gate terminals of the transistors $S_1$-$S_8$, to direct the flow of power between the input and the output of the converter 24, in either direction. The controller 26 can generate the drive control signals in a buck-boost control mode, a two-mode control mode, a quadrangle control mode, or other control mode for the transfer of power by switching the transistors $S_1$-$S_8$. Example drive control modes of operation are described below with reference to FIGS. 5A-5C. Quadrangle control mode is preferred in one example to reduce common mode EMI emission by the converter 24, although other modes can be relied upon in other cases. Power flow in the converter 24 can also be directed, at least in part, by phase-shifting the drive control signals of the transistors $S_1$-$S_8$ other using phase shift modulation, for example.

The input capacitor branch of capacitors $C_{11}$ and $C_{12}$ operates as an energy storage element at the input, the inductors $L_1$ and $L_2$ operate as the energy storage and transfer elements, and the output capacitor branch of capacitors $C_{21}$ and $C_{22}$ operates as an energy storage element at an output of the converter 24. The input capacitor branch of capacitors $C_{11}$ and $C_{12}$, is coupled across the input leg of the switches $S_1$-$S_4$, and the output capacitor branch of capacitors $C_{21}$ and $C_{22}$ is coupled across the output leg of the switches $S_5$-$S_8$. A center input capacitor branch node between the capacitors $C_{11}$ and $C_{12}$ is coupled to a center node between the second input-side switch $S_2$ and the third input-side switch $S_2$. A center output capacitor branch node between the capacitors $C_{21}$ and $C_{22}$ is coupled to a center node between the second output-side switch $S_6$ and the third output-side switch $S_6$. The capacitors $C_{11}$, $C_{12}$, $C_{21}$, and $C_{22}$ can be embodied as any suitable type(s) of capacitors having capacitances based on the application for use of the converter 24, the input Vin and output Vout voltages of the converter 24, the load placed on the converter 24, the operating frequency and duty cycle of the drive control signals provided to the converter 24, the power handling capacity of the converter 24, and other factors.

The inductor $L_1$ is coupled, at one end, at a node A between the first input-side switch $S_1$ and the second input-side switch $S_2$ of the input leg of the converter 24. The inductor $L_1$ is also coupled, at another end, at a node C between the first output-side switch $S_5$ and the second output-side switch $S_5$ of the output leg of the converter 24. The inductor $L_2$ is coupled, at one end, at a node B between the third input-side switch $S_3$ and the fourth input-side switch $S_4$ of the input leg of the converter 24. The inductor $L_2$ is also coupled, at another end, at a node D between the third output-side switch $S_7$ and the fourth output-side switch $S_7$ of the output leg of the converter 24. The inductors $L_1$ and $L_2$ can be embodied as any suitable type of inductor at any suitable inductance based on the application for use of the converter 24, the input Vin and output Vout voltages of the converter 24, the load placed on the converter 24, the operating frequency and duty cycle of the drive signals provided to the converter 24, the power handling capacity of the converter 24, and other requirements or factors. The inductors $L_1$ and $L_2$ can also be magnetically coupled by a ferrite or magnetic core in some cases, as described below.

In some cases, the converter 24 can include a midpoint bridge connection 28. As shown in FIG. 3, the midpoint bridge connection 28 is an electrical coupling between the second input-side switch $S_2$ and the third input-side switch $S_3$, at one end, and between the second output-side switch $S_6$ and the third output-side switch $S_6$ at another end. The midpoint bridge connection 28 can be relied upon to further reduce EMI from the converter 24 in some cases. The midpoint bridge connection 28 can be omitted from the converter 24 in other cases.

The controller 26 is configured to generate drive control signals for the gates of the transistors $S_1$-$S_8$ in the converter 24, as understood in the field and described herein, to direct the flow of power between the input and the output of the converter 24, in either direction. The controller 26 can be embodied as processing circuitry, including memory, configured to control the operation of the converter 24, with or without feedback. The controller 26 can be embodied as any suitable type of controller, such as a PID controller, a PI controller, or a multi-pole multi-zero controller, among others, to control the operations of the converter 24. The controller 26 can be realized using a combination of processing circuitry and referenced as a single controller. It should be appreciated, however, that the controller 26 can be realized using a number of controllers, control circuits, drivers, and related circuitry, operating with or without feedback.

In some cases, the controller 26 can receive a metric or measure of one or more of the input voltage Vin, the input current, the output voltage Vout, the output current, the operating frequency, or other operating metrics of the converter system 20 or the converter 24, as inputs, along with external control inputs. The controller 26 can generate the drive control signals for the gates of the transistors $S_1$-$S_8$ in the converter 24 based, at least in part, on the feedback metrics provided to the controller 26 and a drive control mode or scheme, although the controller 26 can also operate with open loop control in some cases. The duty cycles of the drive control signals can also be varied by the controller 26 to direct the transfer of power by the converter 24.

As also described below, the controller 26 can be configured to generate drive control signals for the transistors $S_1$-$S_8$ using a symmetrical modulation technique, where pairs of the transistors $S_1$-$S_8$ share a common gate drive control signal. In such a symmetrical modulation technique, switches $S_1$ and $S_4$ share a common or same drive control signal, $S_2$ and $S_3$ share a common or same drive control signal, $S_5$ and $S_8$ share a common or same drive control signal, and $S_6$ and $S_7$ share a common or same drive control signal. Examples drive control modes or schemes that can be implemented by the controller 26 are described below with reference to FIGS. 5A-5C.

Figure 4:
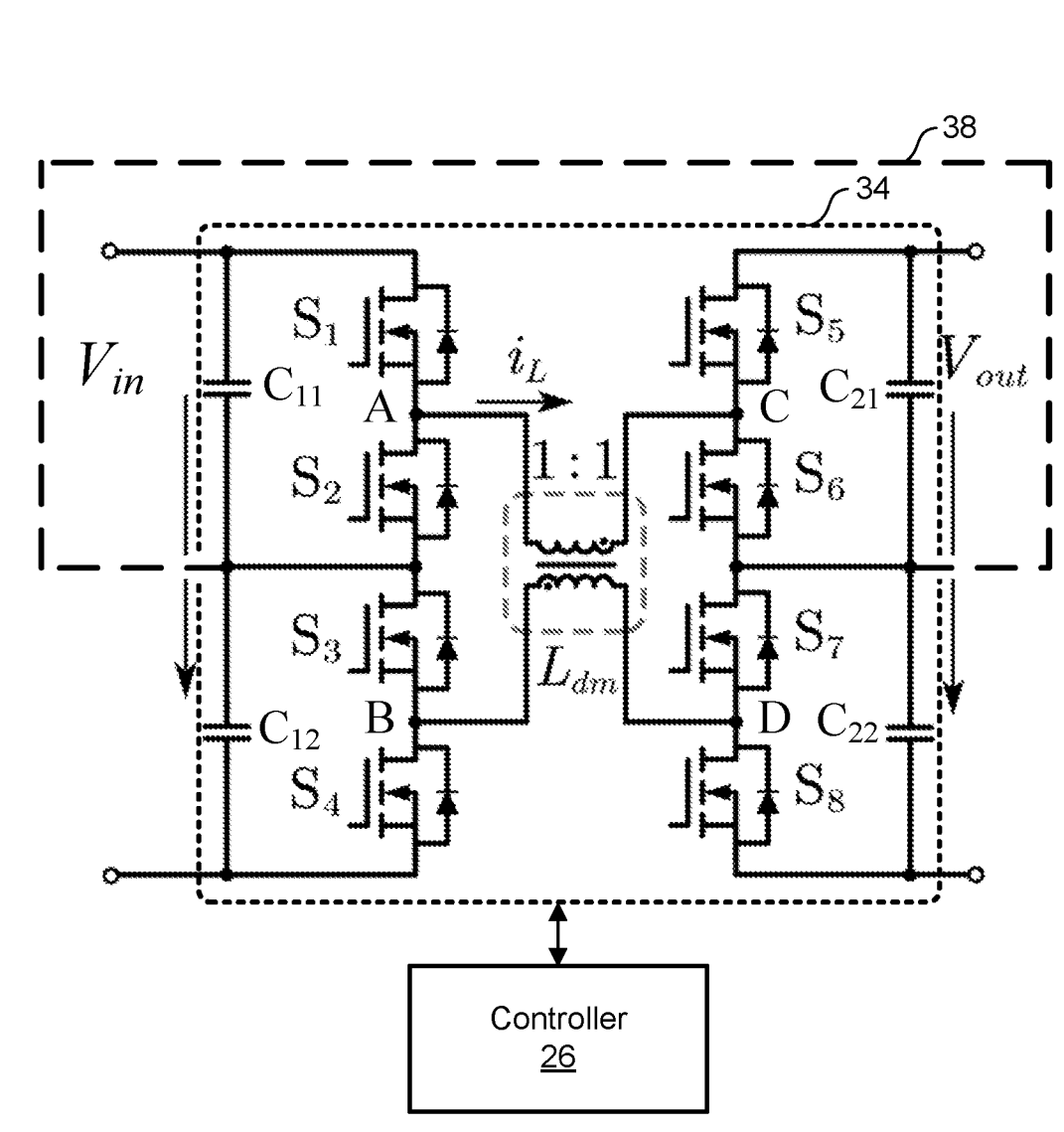
FIG. 4 illustrates another example reduced common mode voltage emission converter system according to aspects of the embodiments.

FIG. 4 illustrates another example reduced common mode voltage emission converter system 30 according to aspects of the embodiments. The converter system 30 includes an input (e.g., left side terminals), a multi-level buck-boost converter 34, a controller 26, and an output (e.g., right side terminals). In the example shown, DC bulk power can be provided at the input of the converter system 30, and a load can be provided at the output of the converter system 30. The converter system 30 is illustrated as a representative example in FIG. 3. The converter system 30 is not exhaustively illustrated, and one or more components of the converter system 30 may be omitted from view although included. Alternatively, one or more of the components of the converter system 30 can be omitted.

The multi-level buck-boost converter 34 ("converter 34") is configured to convert DC input power at an input voltage Vin to DC output power at an output voltage Vout. In the example shown, the converter 34 includes an input capacitor branch of capacitors $C_{11}$ and $C_{12}$, a multi-level switch bridge of transistors $S_1$-$S_8$, a coupled inductor $L_{dm}$, and an output capacitor branch of capacitors $C_{21}$ and $C_{22}$, among possibly other components. The converter 34 is capable of bi-directional power conversion, including the capability to convert or transfer power from the input to the output of the converter 34 and from the output to the input of the converter 34. The converter 34 is also capable of step-up and step-down operation, in both directions of power transfer, and can be controlled to minimize the RMS value of $i_L$ in the coupled inductor $L_{dm}$ and achieve ZVS in some operating modes.

The converter 34 is similar to the converter 24 shown in FIG. 3 but includes the inductor Lam in place of the separated inductors $L_1$ and $L_2$. In the inductor $L_{dm}$, two separate inductors similar to the inductors $L_1$ and $L_2$ shown in FIG. 3 are magnetically coupled, such as wound together around a ferrite or magnetic core with a 1:1 turns ratio. The inductor $L_{dm}$ offers lower winding loss and natural balancing as compared to the use of the inductors $L_1$ and $L_2$, among other benefits for some applications.

In some cases, the converter 34 can include a midpoint bridge connection 38. As shown in FIG. 4, the midpoint bridge connection 38 is an electrical coupling between the second input-side switch $S_2$ and the third input-side switch $S_3$, at one end, and between the second output-side switch $S_6$ and the third output-side switch $S_6$ at another end. The midpoint bridge connection 38 can be relied upon to further reduce EMI from the converter 34 in some cases. The midpoint bridge connection 38 can be omitted from the converter 34 in other cases.

The controller 26 can be configured to generate drive control signals for the transistors $S_1$-$S_8$ in the converter 34 using a symmetrical modulation technique, where pairs of the transistors $S_1$-$S_8$ share a common gate drive control signal. In such a symmetrical modulation technique, switches $S_1$ and $S_4$ share a common or the same drive control signal, $S_2$ and $S_3$ share a common or the same drive control signal, $S_5$ and $S_8$ share a common or the same drive control signal, and $S_6$ and $S_7$ share a common or the same drive control signal. Examples drive control modes or schemes that can be implemented by the controller 26 are described below with reference to FIGS. 5A-5C.

Figure 5A:
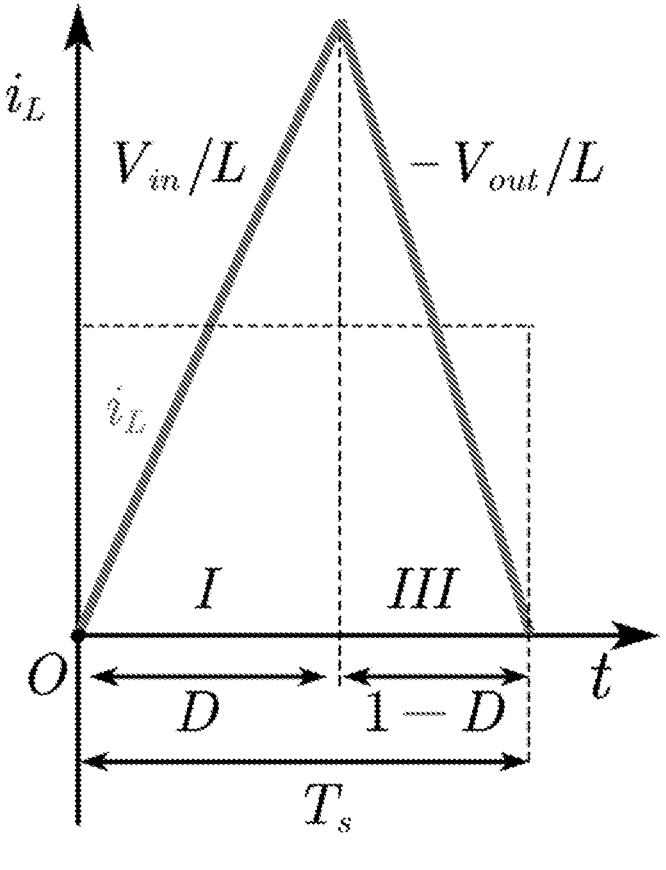
FIG. 5A illustrates an example buck-boost control mode for the converters shown in FIGS. 3 and 4 according to aspects of the embodiments.
Figure 5B:
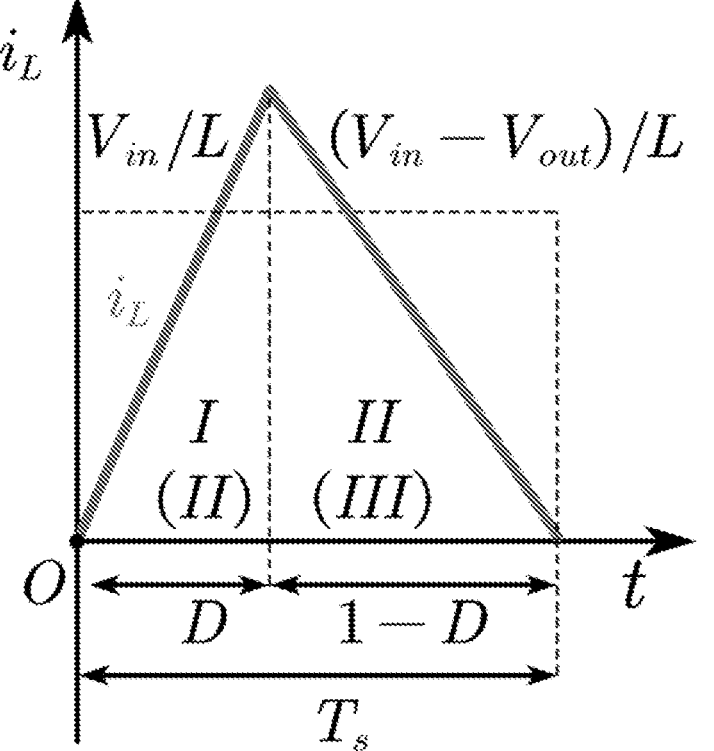
FIG. 5B illustrates an example two-mode control mode for the converters shown in FIGS. 3 and 4 according to aspects of the embodiments.
Figure 5C:
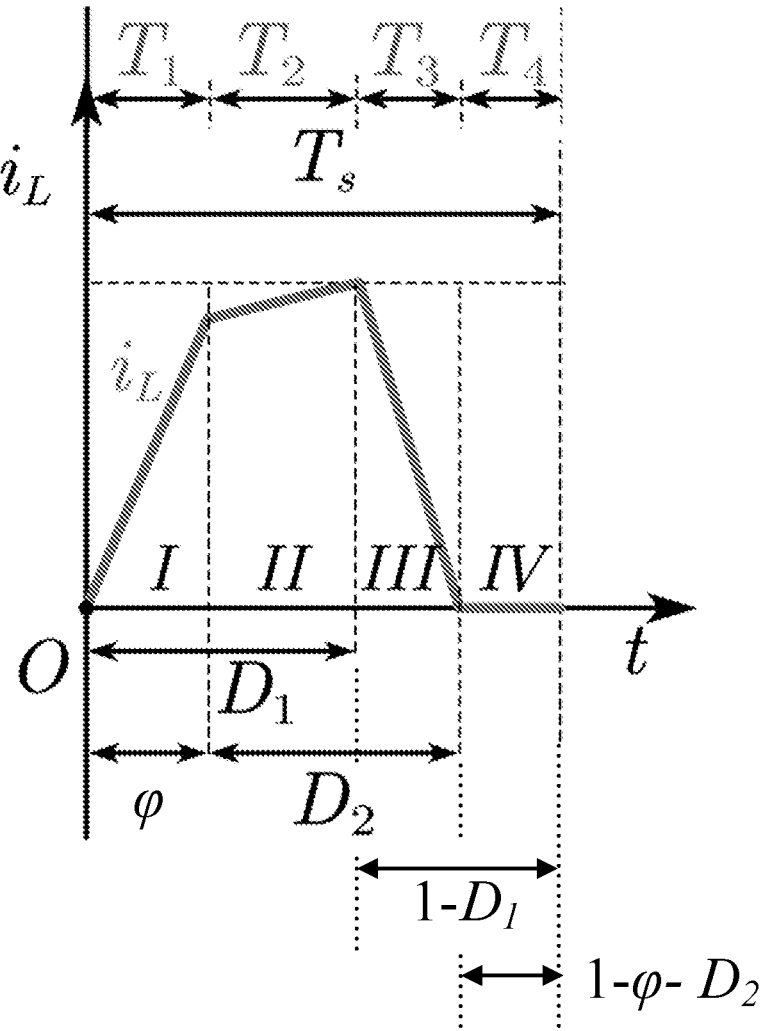
FIG. 5C illustrates an example quadrangular current control mode for the converters shown in FIGS. 3 and 4 according to aspects of the embodiments.

FIGS. 5A-5C illustrate example switching modes that can be implemented by the controller 26 to generate the drive control signals for the gates of the transistors $S_1$-$S_8$ in the converters 24 and 34. The switching modes are provided as representative examples, and the controller 26 can also implement other switching modes and variations on the modes shown in FIGS. 5A-5C. For example, the controller 26 can vary or alter the switching sequences, duty cycles, and other control aspects as compared to that shown in FIGS. 5A-5C, as needed, to change the direction of power transfer, the extent of power transfer, and other operating characteristics of the converters 24 and 34. The horizontal axes in FIGS. 5A-5C are associated with time over the switching cycle, and the vertical axes in FIGS. 5A-5C are associated with current $i_L$ in one of the inductors $L_1$ and $L_2$, as applied to the converter 24 shown in FIG. 3, or current $i_L$ in the inductor $L_{dm}$, as applied to the converter 34 shown in FIG. 4. It should be appreciated that the current $i_L$ is illustrated as an example among FIGS. 5A-5C. In practice, the current $i_L$ can vary as compared to that shown, depending on the input and output voltages Vin and Vout (e.g., whether Vin>Vout, Vin=Vout, or Vin<Vout) of the converters 24 and 34, the period Ts, the duty cycle D, the inductance of the inductors, and other factors.

The controller 26 is configured to generate drive control signals for the transistors $S_1$-$S_8$ in the converters 24 and 34 using a symmetrical modulation technique, where pairs of the transistors $S_1$-$S_8$ share a common gate drive control signal. In such a symmetrical modulation technique, switches $S_1$ and $S_4$ share a common or same drive control signal, $S_2$ and $S_3$ share a common or same drive control signal, $S_5$ and $S_8$ share a common or same drive control signal, and $S_6$ and $S_7$ share a common or same drive control signal.

Using that symmetrical technique, the controller 26 is configured to implement switching modes "I," "II," "III," and "IV," as shown in FIGS. 5A-5C. In switching mode "I," the controller 26 generates drive control signals to turn the $S_1$ and $S_4$ pair and the $S_6$ and $S_7$ pair on (i.e., permitting the flow of charge) and to turn $S_2$, $S_3$, $S_5$, and $S_8$ off (i.e., preventing the flow of charge). In switching mode "II," the controller 26 generates drive control signals to turn the $S_1$ and $S_4$ pair and the $S_5$ and $S_8$ pair on and $S_2$, $S_3$, $S_6$, and $S_7$ off. In switching mode "III," the controller 26 generates drive control signals to turn the $S_2$ and $S_3$ pair and the $S_5$ and $S_8$ pair on and $S_1$, $S_4$, $S_6$, and $S_7$ off. In switching mode "IV," the controller 26 generates drive control signals to turn the $S_2$ and $S_3$ pair and the $S_6$ and $S_7$ pair on and $S_1$, $S_4$, $S_5$, and $S_8$ off. Mode "IV" is not expected to be used (or used often) in some cases, as this free-wheeling mode can increase the RMS value of $i_L$. Using combinations of modes "I," "II," "III," and "IV" over a switching cycle, the converters 24 and 34 can be operated as step-down, unit-gain, and step-up converter modes.

FIG. 5A illustrates an example buck-boost control mode for the converters 24 and 34 shown in FIGS. 3 and 4 according to aspects of the embodiments. Particularly, FIG. 5A illustrates an example switching sequence of the drive control signals provided from the controller 26 to the transistors $S_1$-$S_4$ over a switching cycle having a period Ts for buck-boost mode control. The operating frequency of the converters 24 and 34 is related to the inverse of the period Ts and can vary among the embodiments as established by the controller 26. During switching mode "I" in FIG. 5A, the $S_1$ and $S_4$ pair and the $S_6$ and $S_7$ pair are driven or turned on (i.e., permitting the flow of charge) and $S_2$, $S_3$, $S_5$, and $S_8$ are driven or turned off (i.e., preventing the flow of charge) by drive control signals provided from the controller 26 during the duty cycle D. During the switching mode "III" in FIG. 5A, the $S_2$ and $S_3$ pair and the $S_5$ and $S_8$ pair are driven or turned on (i.e., permitting the flow of charge) and $S_1$, $S_4$, $S_6$, and $S_7$ are driven or turned off (i.e., preventing the flow of charge) by drive control signals provided from the controller 26 during the remainder of the switching cycle, 1-D. The duty cycle D can vary during the period Ts based on the direction and extent of power transfer provided by the converters 24 and 34, among other factors.

FIG. 5B illustrates an example two-mode control mode for the converters 24 and 34 shown in FIGS. 3 and 4 according to aspects of the embodiments. Particularly, FIG. 5B illustrates an example switching sequence of the drive control signals provided from the controller 26 to the transistors $S_1$-$S_8$ over a switching cycle having a period Ts for two-mode control. In the forward (e.g., input to output) transfer of power using two-mode control, the $S_1$ and $S_4$ pair and the $S_6$ and $S_7$ pair are driven or turned on (i.e., permitting the flow of charge) and $S_2$, $S_3$, $S_5$, and $S_8$ are driven or turned off (i.e., preventing the flow of charge) by drive control signals provided from the controller 26 during the duty cycle D as part of switching mode "I." The $S_1$ and $S_4$ pair and the $S_5$ and $S_8$ pair are driven or turned on (i.e., permitting the flow of charge) and $S_2$, $S_3$, $S_6$, and $S_7$ are driven or turned off (i.e., preventing the flow of charge) by drive control signals provided from the controller 26 during the remainder of the switching cycle, 1-D, in switching mode "II." In the backward (e.g., output to input) transfer of power using two-mode control, the controller 26 provides control signals for switching mode "II" during the duty cycle D and for switching mode "III" during the remainder of the switching cycle, 1-D.

FIG. 5C illustrates an example quadrangular control mode for the converters 24 and 34 shown in FIGS. 3 and 4 according to aspects of the embodiments. Particularly, FIG. 5C illustrates an example switching sequence of the drive control signals provided from the controller 26 to the transistors $S_1$-$S_8$ over a switching cycle having a period Ts for quadrangular control. In quadrangular control, the period Ts is divided into four sub-periods, $T_1$, $T_2$, $T_3$, and $T_4$. The controller 26 steps through modes "I," "II," "III," and "IV," as shown in FIG. 5C. The duty cycles $D_1$ and $D_2$ can vary during the period Ts based on the extent of power transfer provided by the converters 24 and 24, among other factors. A phase shift control variable $\varphi$ is also introduced, as the difference between the start of $D_1$ and $D_2$, and the phase shift $\varphi$ can be tailored to adjust the RMS value of $i_L$ over $D_1$.

Each of the switching or operating modes shown in FIGS. 5A-5C can offer certain benefits depending on the application for use of the converters 24 and 34 and other factors. The quadrangular or quadrangle control mode shown in FIG. 5C can preferred in some cases, for example, such as to minimize the RMS value of $i_L$ in the inductor L and achieve ZVS, although other modes can be preferred for other operating characteristics, for simplicity, or other objectives. Additionally, the converters 24 and 34 exhibit less EMI than other types of converters during operation, including less EMI than the converter 14 shown in FIG. 1. The arrangement of the multi-level switch bridge of transistors $S_1$-$S_8$ in the converters 24 and 34, the use of the symmetrical modulation techniques provided by the controller 26, and the use of quadrangle control mode by the controller 26, and other factors contribute to less EMI and other benefits.

Figure 6:
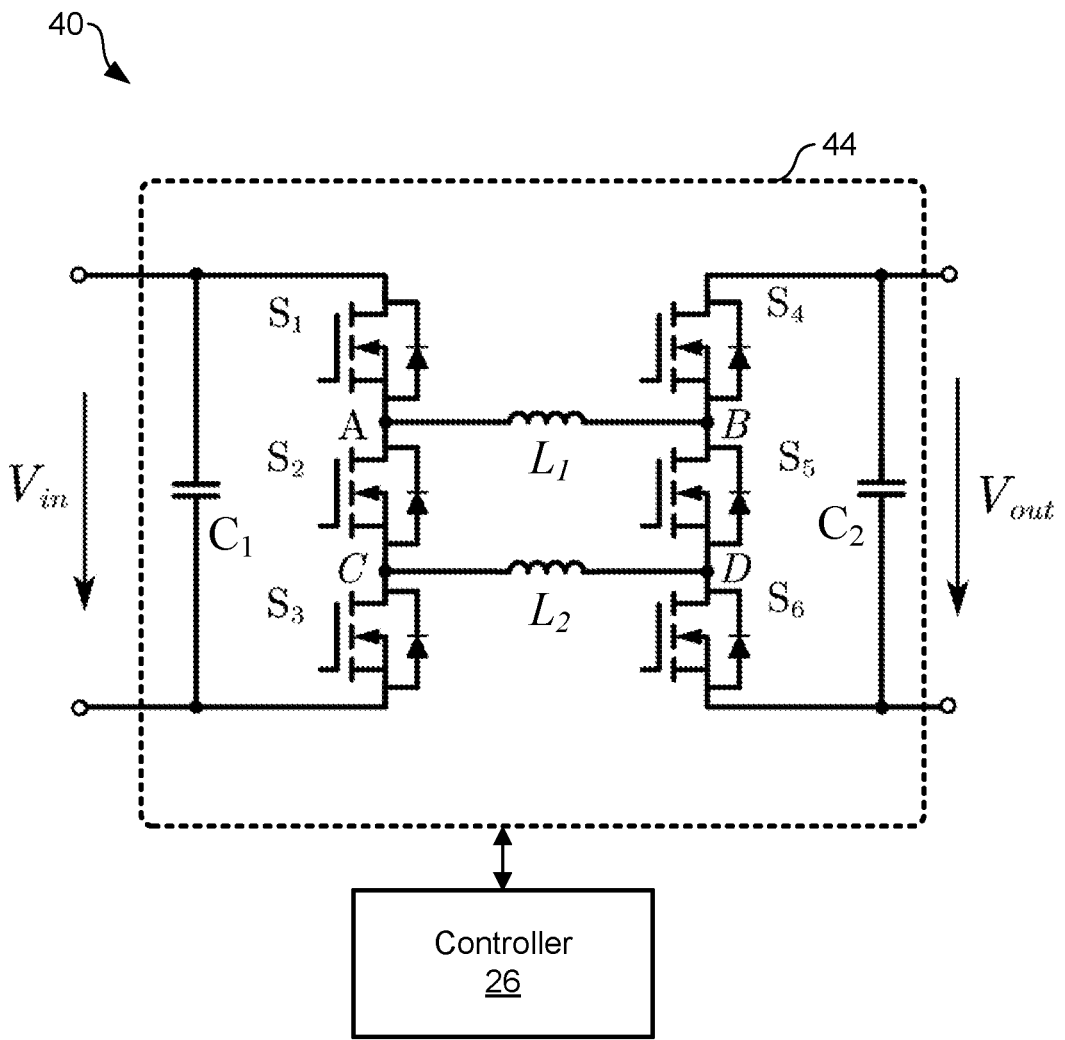
FIG. 6 illustrates another example reduced common mode voltage emission converter system according to aspects of the embodiments.

FIG. 6 illustrates another example reduced common mode voltage emission converter system 40 according to aspects of the embodiments. The converter system 40 includes an input (e.g., left side terminals), a multi-level buck-boost converter 44, a controller 26, and an output (e.g., right side terminals). In the example shown, DC bulk power can be provided at the input of the converter system 40, and a load can be provided at the output of the converter system 40. The converter system 40 is illustrated as a representative example in FIG. 6. The converter system 40 is not exhaustively illustrated, and one or more components of the converter system 40 may be omitted from view although included. Alternatively, one or more of the components of the converter system 40 can be omitted.

Input power is provided to the converter system 40. The input power can be bulk DC power in one example, although bulk AC power can be provided to the converter system 40 in some cases with the use of an AC-to-DC converter as a front end (not shown, see FIG. 1 for example). The multi-level buck-boost converter 44 ("converter 44") is configured to convert DC input power at an input voltage Vin to DC output power at an output voltage Vout. In the example shown, the converter 44 includes an input capacitor $C_1$, a multi-level switch bridge of transistors $S_1$-$S_6$, inductors $L_1$ and $L_2$, and an output capacitor $C_2$, among possibly other components. The converter 44 is capable of bi-directional power conversion, including the capability to convert or transfer power from the input to the output of the converter 44 and from the output to the input of the converter 44. The converter 44 is also capable of step-up and step-down operation, in both directions of power transfer, and can be controlled to minimize the RMS value of $i_L$ in the inductor $L_1$ and achieve ZVS in some operating modes.

The transistors $S_1$-$S_6$ can be embodied as IGBTs in one example, although other types of switching transistors can be relied upon. The transistors $S_1$-$S_6$ (also referred to herein as "switches") include an input leg of the switches $S_1$-$S_3$ (also "input-side switches $S_1$-$S_3$") coupled in series across an input of the converter 44 and an output leg of the switches $S_4$-$S_6$ (also "output-side switches $S_4$-$S_6$") coupled in series across an output of the converter 44.

The transistors $S_1$-$S_6$ can be driven (e.g., switched on and off) by drive control signals generated by the controller 26, as described herein and understood in the field. The drive control signals are provided to the gates or gate terminals of the transistors $S_1$-$S_6$, to direct the flow of power between the input and the output of the converter 44, in either direction. The controller 46 can generate the drive control signals in a buck-boost control mode, a two-mode control mode, a quadrangle control mode, or other control mode for the transfer of power by switching the transistors $S_1$-$S_6$. Example drive control modes of operation are described below and are similar to those shown above with reference to FIGS. 5A-5C. Quadrangle control mode is preferred in one example to reduce common mode EMI emission by the converter 44, although other modes can be relied upon in other cases. Power flow in the converter 44 can also be directed, at least in part, by phase-shifting the drive control signals of the transistors $S_1$-$S_6$ other using phase shift modulation, for example.

The input capacitor $C_1$ operates as an energy storage element at the input, the inductors $L_1$ and $L_2$ operate as energy storage and transfer elements, and the output capacitor $C_2$ operates as an energy storage element at an output of the converter 44. The inductor $L_1$ is coupled, at one end, at a node A between the first input-side switch $S_1$ and the second input-side switch $S_2$ of the input leg of the converter 44. The inductor $L_1$ is also coupled, at another end, at a node B between the first output-side switch $S_4$ and the second output-side switch $S_5$ of the output leg of the converter 44. The inductor $L_2$ is coupled, at one end, at a node C between the second input-side switch $S_2$ and the third input-side switch $S_3$ of the input leg of the converter 44. The inductor $L_2$ is also coupled, at another end, at a node D between the second output-side switch $S_5$ and the third output-side switch $S_6$ of the output leg of the converter 44. The inductors $L_1$ and $L_2$ can be embodied as any suitable types of inductors having inductance based on the application for use of the converter 44, the input Vin and output Vout voltages of the converter 44, the load placed on the converter 44, the operating frequency and duty cycle of the drive signals provided to the converter 44, the power handling capacity of the converter 44, and other requirements or factors. The inductors $L_1$ and $L_2$ can also be magnetically coupled by a ferrite or magnetic core in some cases, as described below.

The controller 26 is configured to generate drive control signals for the gates of the transistors $S_1$-$S_6$ in the converter 44, as understood in the field and described herein, to direct the flow of power between the input and the output of the converter 44, in either direction. In some cases, the controller 26 can receive a metric or measure of one or more of the input voltage Vin, the input current, the output voltage Vout, the output current, the operating frequency, or other operating metrics of the converter system 40 or the converter 44, as inputs, along with external control inputs. The controller 26 can generate the drive control signals for the gates of the transistors $S_1$-$S_6$ in the converter 44 based, at least in part, on the feedback metrics provided to the controller 26 and a drive control mode or scheme, although the controller 26 can also operate with open loop control in some cases. The duty cycles of the drive control signals can also be varied by the controller 26 to direct the transfer of power by the converter 44.

The controller 26 can be configured to generate drive control signals for the transistors $S_1$-$S_6$ using a symmetrical modulation technique, where certain pairs of the transistors $S_1$-$S_6$ share a common gate drive control signal. In such a symmetrical modulation technique, switches $S_1$ and $S_3$ share a common or same drive control signal and switches $S_4$ and $S_6$ share a common or same drive control signal. The switch $S_2$ and the switch $S_5$ receive separate drive control signals from the controller 26.

Using that symmetrical technique, the controller 26 is configured to implement switching modes "I," "II," "III," and "IV" for the converter 44, which are similar to those shown above in FIGS. 5A-5C. In switching mode "I," the controller 26 generates drive control signals to turn the $S_1$ and $S_3$ pair and $S_5$ on and to turn $S_2$, $S_4$, and $S_5$ off. In switching mode "II," the controller 26 generates drive control signals to turn the $S_1$ and $S_3$ pair and the $S_4$ and $S_6$ pair on and $S_2$ and $S_5$ off. In switching mode "III," the controller 26 generates drive control signals to turn the $S_2$ and the $S_4$ and $S_6$ pair on and $S_1$, $S_3$, and $S_5$ off. In switching mode "IV," the controller 26 generates drive control signals to turn $S_2$ and $S_5$ on and $S_1$, $S_3$, $S_4$, and $S_6$ off. Mode "IV" is not expected to be used (or used often) in some cases, as this free-wheeling mode can increase the RMS value of $i_L$. Using combinations of modes "I," "II," "III," and "IV" over a switching cycle, the converter 44 can be operated as step-down, unit-gain, and step-up converter modes.

Figure 7:
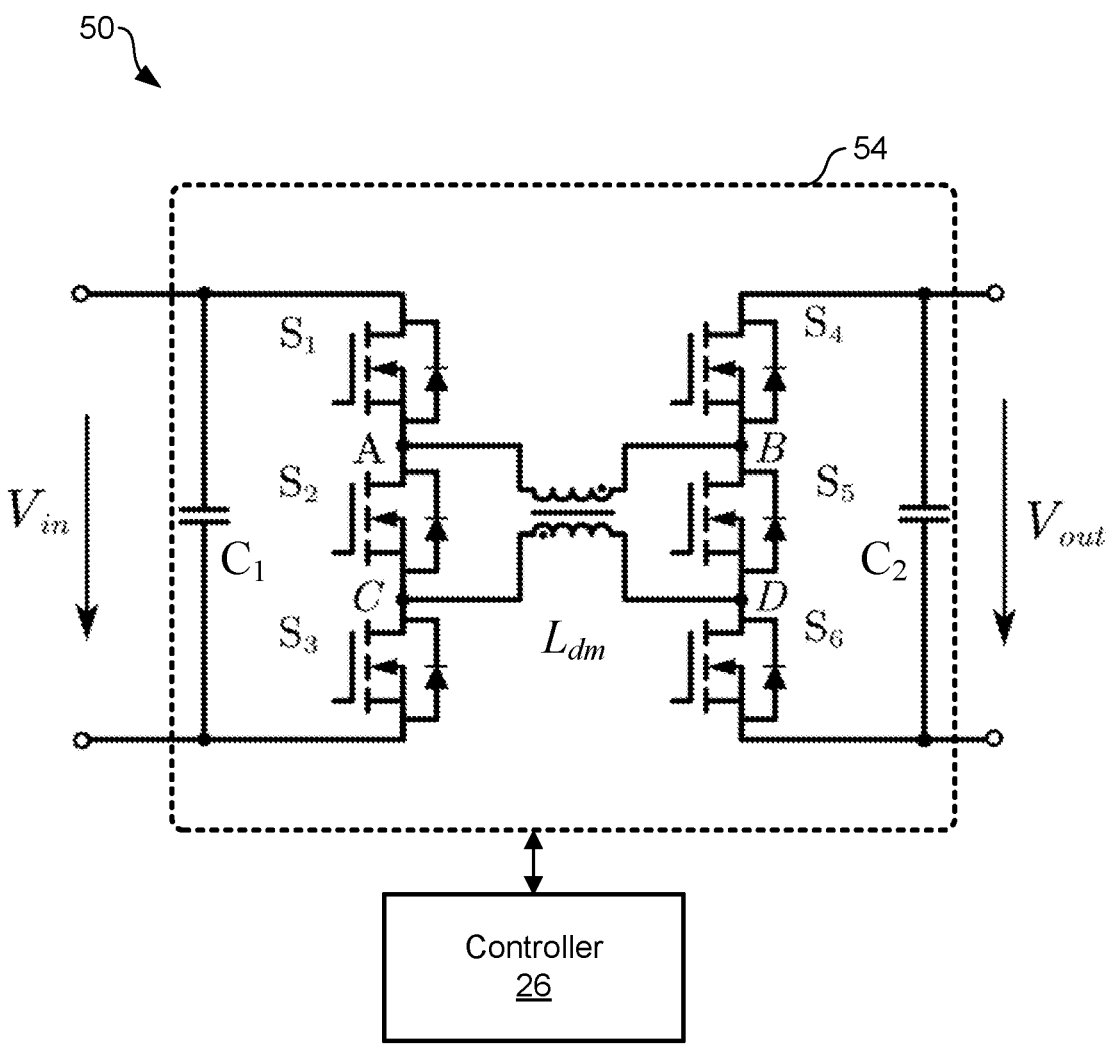
FIG. 7 illustrates another example reduced common mode voltage emission converter system according to aspects of the embodiments.

FIG. 7 illustrates another example reduced common mode voltage emission converter system 50 according to aspects of the embodiments. The converter system 50 includes an input (e.g., left side terminals), a multi-level buck-boost converter 54, a controller 26, and an output (e.g., right side terminals). The converter 54 is similar to the converter 44 shown in FIG. 6 but includes the inductor $L_{dm}$ in place of the separated inductors $L_1$ and $L_2$. In the inductor $L_{dm}$, two separate inductors similar to the inductors $L_1$ and $L_2$ shown in FIG. 6 are magnetically coupled, such as wound together around a ferrite or magnetic core with a 1:1 turns ratio. The inductor Lam offers lower winding loss and natural balancing as compared to the use of the inductors $L_1$ and $L_2$, among other benefits for some applications.

One or more microprocessors, microcontrollers, or DSPs can execute software to perform the control aspects of the embodiments described herein, such as the control aspects performed by the controller 16 and the controller 26. Any software or program instructions can be embodied in or on any suitable type of non-transitory computer-readable medium for execution. Example computer-readable mediums include any suitable physical (i.e., non-transitory or non-signal) volatile and non-volatile, random and sequential access, read/write and read-only, media, such as hard disk, floppy disk, optical disk, magnetic, semiconductor (e.g., flash, magneto-resistive, etc.), and other memory devices. Further, any component described herein can be implemented and structured in a variety of ways. For example, one or more components can be implemented as a combination of discrete and integrated analog and digital components.

The features, structures, or characteristics described above may be combined in one or more embodiments in any suitable manner, and the features discussed in the various embodiments are interchangeable, if possible. In the foregoing description, numerous specific details are provided in order to fully understand the embodiments of the present disclosure. However, a person skilled in the art will appreciate that the technical solution of the present disclosure may be practiced without one or more of the specific details, or other methods, components, materials, and the like may be employed. In other instances, well-known structures, materials, or operations are not shown or described in detail to avoid obscuring aspects of the present disclosure.

Although relative terms such as "above," "below," "upper," "lower," "top," "bottom," "right," "left," "input," and "output" may be used to describe the relative spatial relationships of certain components or structural features, the terms are used for convenience in the examples. It should be understood that if a device or component is turned upside down, the "upper" component will become a "lower" component. When a structure or feature is described as being "on" (or formed on) another structure or feature, the structure can be positioned directly on (i.e., contacting) the other structure, without any other structures or features intervening between the structure and the other structure. When a structure or feature is described as being "over" (or formed over) another structure or feature, the structure can be positioned over the other structure, with or without other structures or features intervening between them. When two components are described as being "coupled to" each other, the components can be electrically coupled to each other, with or without other components being electrically coupled and intervening between them. When two components are described as being "directly coupled to" each other, the components can be electrically coupled to each other, without other components being electrically coupled between them.

Terms such as "a," "an," "the," and "said" are used to indicate the presence of one or more elements and components. The terms "comprise," "include," "have," "contain," and their variants are used to be open ended and may include or encompass additional elements, components, etc., in addition to the listed elements, components, etc., unless otherwise specified. The terms "first," "second," etc. are used as distinguishing labels in some cases, rather than a limitation of the number of the objects, unless otherwise specified.

Although embodiments have been described herein in detail, the descriptions are by way of example. The features of the embodiments described herein are representative and, in alternative embodiments, certain features and elements can be added or omitted. Additionally, modifications to aspects of the embodiments described herein can be made by those skilled in the art without departing from the spirit and scope of the present invention defined in the following claims, the scope of which are to be accorded the broadest interpretation so as to encompass modifications and equivalent structures.

Therefore, the following is claimed:

1. A power converter system, comprising:

an input and an output;

a multi-level buck-boost switch bridge coupled between the input and the output, the multi-level buck-boost switch bridge comprising:

a plurality of inductors;

an input leg of four input-side switches coupled in series across the input, the input leg of four input-side switches comprising a first input-side switch, a second input-side switch, a third input-side switch, and a fourth input-side switch; and an output leg of four output-side switches coupled in series across the output, the output leg of four output-side switches comprising a first output-side switch, a second output-side switch, a third output-side switch, and a fourth output-side switch;

an input capacitor branch coupled across the input;

an output capacitor branch coupled across the output; and a controller configured to implement a quadrangular control mode in which a switching cycle having a period is divided into four sequential sub-periods comprising a first sub-period, a second sub-period, a third sub-period, and a fourth sub-period, wherein:

during the first sub-period of the switching cycle, the first input-side switch, the fourth input-side switch, the second output-side switch, and the third output-side switch are turned on while the second input-side switch, the third input-side switch, the first output-side switch, and the fourth output-side switch are turned off;

during the second sub-period of the switching cycle, the first input-side switch, the fourth input-side switch, the first output-side switch, and the fourth output-side switch are turned on while the second input-side switch, the third input-side switch, the second output-side switch, and the third output-side switch are turned off;

during the third sub-period of the switching cycle, the second input-side switch, the third input-side switch, the first output-side switch, and the fourth output-side switch are turned on while the first input-side switch, the fourth input-side switch, the second output-side switch, and the third output-side switch are turned off;

during the fourth sub-period of the switching cycle, the second input-side switch, the third input-side switch, the second output-side switch, and the third output-side switch are turned on while the first input-side switch, the fourth input-side switch, the first output-side switch, and the fourth output-side switch are turned off; and each of the four sequential sub-periods involves at least four switches being concurrently turned on to actively regulate power transfer through the plurality of inductors.

2. The power converter system according to claim 1, wherein one or more switches among the four input-side switches of the input leg and the four output-side switches of the output leg comprise III-Nitride.

3. The power converter system according to claim 1, wherein the plurality of inductors are each coupled, at one end, between respective nodes among the four input-side switches of the input leg and, at another end, between respective nodes among the four output-side switches of the output leg.

4. The power converter system according to claim 1, wherein the input leg of four input-side switches comprises the first input-side switch coupled in series with the second input-side switch, the second input-side switch coupled in series with the third input-side switch, and the third input-side switch coupled in series with the fourth input-side switch.

5. The power converter system according to claim 4, wherein the output leg of four output-side switches comprises the first output-side switch coupled in series with the second output-side switch, the second output-side switch coupled in series with the third output-side switch, and the third output-side switch coupled in series with the fourth output-side switch.

6. The power converter system according to claim 5, wherein:

the input capacitor branch comprises two input capacitors coupled in series across the input; and the output capacitor branch comprises two output capacitors coupled in series across the output.

7. The power converter system according to claim 6, wherein:

a center input capacitor branch node between the two input capacitors of the input capacitor branch is coupled to a center input leg node between the second input-side switch and the third input-side switch of the input leg of four input-side switches.

8. The power converter system according to claim 6, wherein:

a center output capacitor branch node between the two output capacitors of the output capacitor branch is coupled to a center output leg node between the second output-side switch and the third output-side switch of the output leg of four output-side switches.

9. The power converter system according to claim 5, wherein:

a first inductor among the plurality of inductors is coupled, at one end, between the first input-side switch and the second input-side switch of the input leg of four input-side switches and, at another end, between the first output-side switch and the second output-side switch of the output leg of four output-side switches; and a second inductor among the plurality of inductors is coupled, at one end, between the third input-side switch and the fourth input-side switch of the input leg of four input-side switches and, at another end, between the third output-side switch and the fourth output-side switch of the output leg of four output-side switches.

10. The power converter system according to claim 9, wherein the first inductor and the second inductor are magnetically coupled.

11. The power converter system according to claim 5, further comprising a midpoint bridge connection between the input leg of four input-side switches and the output leg of four output-side switches.

12. The power converter system according to claim 1, further comprising a midpoint bridge connection coupled between the input and the output.

13. The power converter system according to claim 1, wherein the controller is further configured to vary duty cycles of the first sub-period, the second sub-period, the third sub-period, and the fourth sub-period based on feedback metrics comprising at least one of an output voltage and an output current.

14. The power converter system according to claim 1, wherein the controller is further configured to generate drive control signals for sequentially activating switch pairs during the four sequential sub-periods according to the quadrangular control mode.

15. The power converter system according to claim 1, wherein the controller is further configured to:

receive feedback metrics comprising at least one of an input voltage and an output current; and vary duty cycles of the first sub-period, the second sub-period, the third sub-period, and the fourth sub-period based on the feedback metrics.

* * * * *